United States Patent [19]
Snell

[11] Patent Number: 5,907,229
[45] Date of Patent: May 25, 1999

[54] METHOD AND DEVICE FOR CALIBRATION OF MOVEMENT AXES OF AN INDUSTRIAL ROBOT

[75] Inventor: John-Erik Snell, Västerås, Sweden

[73] Assignee: Asea Brown Boveri AB, Vasteras, Sweden

[21] Appl. No.: 08/930,008

[22] PCT Filed: Mar. 26, 1996

[86] PCT No.: PCT/SE96/00376

§ 371 Date: Sep. 29, 1997

§ 102(e) Date: Sep. 29, 1997

[87] PCT Pub. No.: WO96/30171

PCT Pub. Date: Oct. 3, 1996

[30] Foreign Application Priority Data

Mar. 30, 1995 [SE] Sweden ................................. 9501137

[51] Int. Cl.[6] .............................................. G05B 19/408
[52] U.S. Cl. ................... 318/569; 318/572; 318/568.22; 356/375; 395/94; 901/47; 73/1.79
[58] Field of Search ..................................... 318/560, 561, 318/563, 565, 568.11–579; 356/375; 395/94; 901/47; 73/1.79, 1.81

[56] References Cited

U.S. PATENT DOCUMENTS

| 4,676,002 | 6/1987 | Slocum | 33/1 MP |
|---|---|---|---|
| 4,714,339 | 12/1987 | Lau et al. | 356/4.09 |
| 4,961,267 | 10/1990 | Herzog | 33/503 |
| 4,980,626 | 12/1990 | Hess et al. | 318/568.16 |
| 5,090,131 | 2/1992 | Deer | 33/556 |
| 5,177,563 | 1/1993 | Everett et al. | 356/375 |
| 5,305,091 | 4/1994 | Gelbart et al. | 356/375 |
| 5,408,409 | 4/1995 | Glassman et al. | 128/653.1 |
| 5,681,981 | 10/1997 | McMurtry | 33/502 |
| 5,687,293 | 11/1997 | Snell | 395/89 |
| 5,783,834 | 7/1998 | Shatas | 250/559.33 |
| 5,802,201 | 9/1998 | Nayar et al. | 382/153 |

*Primary Examiner*—Brian Sircus
*Attorney, Agent, or Firm*—Pollock, Vande Sande & Amernick

[57] ABSTRACT

A method for calibration of an industrial robot is provided. A calibration device comprising devices for emitting a calibration beam within the working range of the robot, and an interruption detector which detects an interruption in the calibration beam are arranged. During the calibration process, a calibration tool supported by the robot hand and comprising a sphere with a known radius is moved towards the calibration beam. When an interruption in the calibration beam is detected, the output signals from the position transducers of the robot axes are read and stored. This process is repeated a plurality of times with different configurations of the robot. Thereafter, the calibration parameters of the robot are calculated based on the kinematic equations of the robot, the read and stored position transducer signals, and the known radius.

4 Claims, 7 Drawing Sheets

METHOD AND DEVICE FOR CALIBRATION OF MOVEMENT AXES OF AN INDUSTRIAL ROBOT

TECHNICAL FIELD

The present invention relates to a method for calibration of an industrial robot, which has a plurality of movement axes with a position transducer for each of the axes adapted to deliver an output signal which defines the current position of the axis, and a robot hand for supporting a tool.

The invention also relates to an industrial robot system with an industrial robot which has a plurality of movement axes with a position transducer for each of these axes which is adapted to deliver an output signal which defines the current position of the axis, a robot hand for supporting a tool, and a control system for controlling the position and orientation of the robot hand in accordance with a program and adapted to receive the output signals of the position transducers.

BACKGROUND OF THE INVENTION

An industrial robot may be viewed as a chain consisting of stiff links. Two links are joined to each other in such a way that they are rotatable in relation to each other around an axis of rotation, or displaceable in relation to each other along a linear movement path. An industrial robot usually has six axes of rotation. The last link in the chain may consist of a tool which, depending on the field of application, may be a gripper, a glue gun or a welding gun. In the following, the links in a robot will be referred to as arms, and their lengths will be referred to as arm's lengths.

For each of the above-mentioned axes of rotation or linear movement paths, servo equipment with a driving motor and a position transducer is provided, the transducer delivering a signal which is a measure of the angle of rotation of the actual axis in relation to a reference position. The servo system of each axis is supplied with a reference value of the angle of rotation or linear movement of the axis, and the driving motor of the axis causes the robot the move until the axis position indicated by the position transducer of the axis corresponds to the reference value supplied to the servo system. In order for the position and orientation of the tool to correspond to the desired values, the mechanical structure of the robot and the parameters, so-called kinematic parameters, which describe it must be known with a high accuracy. Since the kinematic parameters are not exactly the same for each robot, the individual deviations from an ideal robot, that is, the kinematic error parameters of the robot, must be known if a high accuracy is to be attained.

Examples of kinematic error parameters are variations in the lengths of the arms, so-called arm's length errors, obliquities in the axes of rotation in relation to each other, so-called axis-attitude errors, and lateral displacements of the axes in relation to each other, so-called axis-offset errors. These deviations arise during manufacture of the different mechanical components and during the assembly thereof. To this is to be added the fact that the angle indicated by the position transducer of an axis must with great accuracy correspond to the actual angle of rotation of the arm which is controlled with the aid of the axis in question, the so-called encoder offset value. To determine the deviation of an individual robot from an ideal robot, various forms of calibration methods are used.

From Swedish patent document 9303757, a calibration method is known in which a spherical calibration body with a known radius is used. A calibration tool, comprising a sphere with a known radius, mounted on the robot hand is brought into contact with the calibration body in a number of different robot configurations. When the calibration tool and the calibration body are in contact with each other, position transducer signals are read and stored. Thereafter, the calibration parameters of the robot are calculated on the basis of the kinematic equations of the robot, a model of the relationship between axial position and position transducer signal, the known radius, and the read and stored position transducer signals.

The disadvantage with this calibration method is that the robot has to make contact with the calibration tool and that the calibration body has a limited extent. Upon the repeated contact between the robot and the calibration body, mechanical stresses may build up in the robot which may, in turn, lead to an unreliable calibration result. The fact that the reading is performed upon mechanical contact between the calibration tool and the calibration body leads to variations in the reading position; for example, the calibration body may be somewhat resilient upon contact with the calibration tool. The limited extent of the calibration body reduces the possibilities of varying the robot configurations, which in turn affects the accuracy in the calibration.

SUMMARY OF THE INVENTION

The object of the invention is to provide a method for calibration of an industrial robot, wherein mechanical contact between the calibration tool and an outer body is not needed, and which provides greater freedom to vary the configurations of the robot during the calibration, and hence provides improved accuracy.

The invention also aims to provide an industrial robot system with means for carrying out the above-mentioned method.

DETAILED DESCRIPTION OF THE PREFERRED EMBODIMENTS

Figure 1:
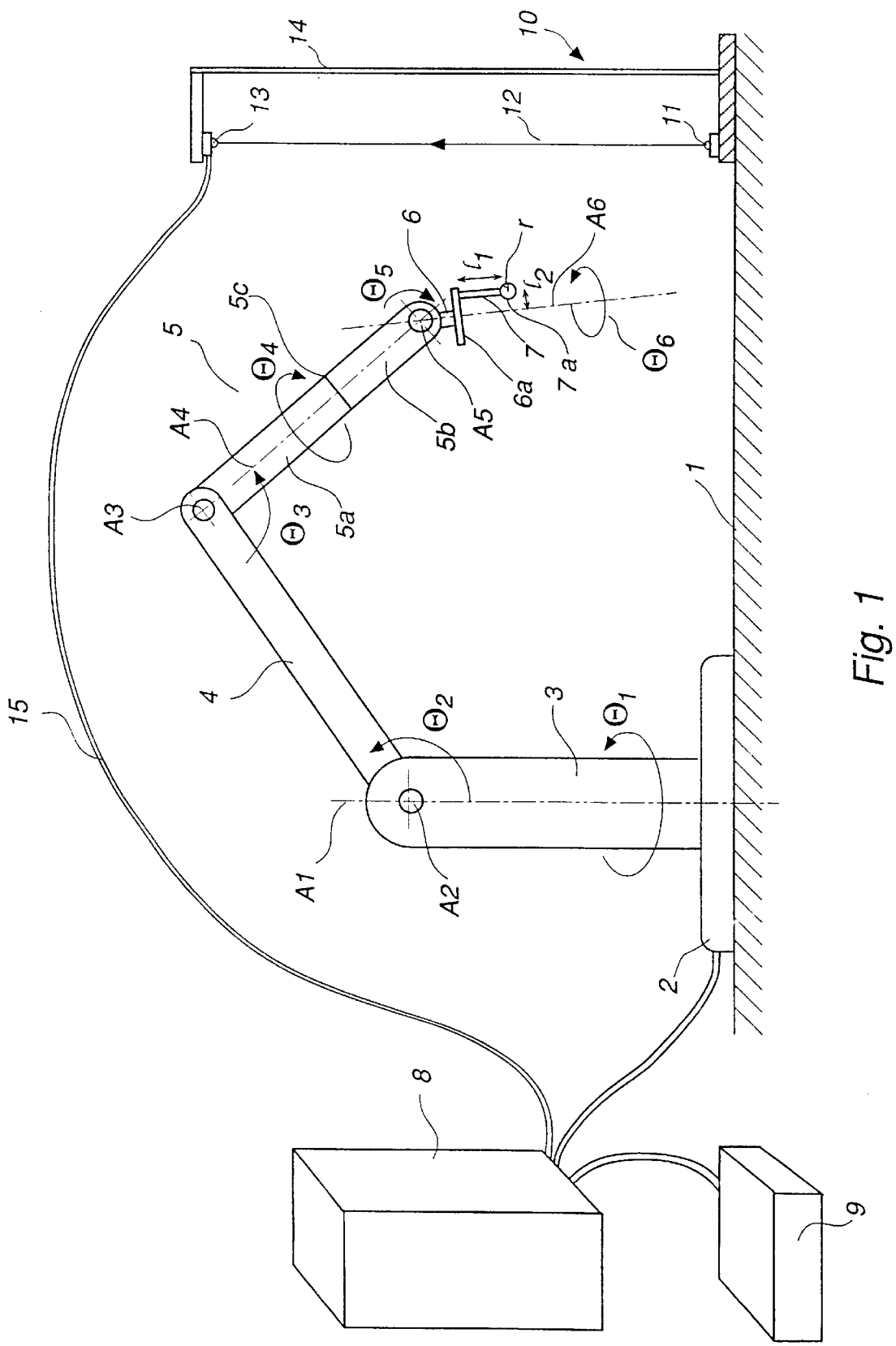
FIG. 1 schematically shows an industrial robot with a calibration tool and a calibration device according to the invention.

FIG. 1 shows an example of a known industrial robot which may advantageously be calibrated with the method and the device according to the invention. On a base 1, the foot 2 of the robot is mounted. The robot has a first arm 3, which is rotatable in relation to the foot 2 around a vertical axis A1. At the upper end of the first arm, a second robot arm 4 is journalled and rotatable in relation to the first arm around a second axis A2. At the outer end of the second arm, a third arm 5 is journalled and rotatable in relation to the second arm around an axis A3. The third robot arm 5 comprises two parts 5a and 5b, the outer part 5b being rotatable in relation to the inner part 5a around an axis of rotation A4 coinciding with the longitudinal axis of the arm. At its outer end, the third arm 5 supports a fourth arm 6, which is rotatable around an axis of rotation A5 perpendicular to the longitudinal axis of the third arm. The outer part of the fourth arm consists of a tool attachment 6a which is rotatable in relation to the inner part of the fourth arm around an axis of rotation A6. The angles of rotation in the six axes of rotation A1 . . . A6 are designated θ1 . . . θ6 in the figure. The fourth arm and the tool attachment are referred to as the hand of the robot. On the tool attachment, a calibration tool 7 is mounted. At its outer end, the calibration tool 7 supports a spherical body 7a, the radius r of which is known. The length $l_1$ and offset $l_2$ of the calibration tool are known.

The control unit 8 of the robot comprises in a known way computer equipment with necessary memories for programs and other data, drives for the driving motors of the various robot axes, and necessary supply equipment. The control unit is connected to a programming unit 9 for programming and other service of the robot.

A calibration device 10 is arranged in the working range of the robot and comprises a transmitter 11 which transmits a calibration beam 12 in the form of a laser beam, and an interruption detector 13 which detects and generates an output signal in case of interruption of the calibration beam 12. The calibration beam is arranged in parallel with the axis of rotation A1. The calibration device further comprises a stand 14 which supports the transmitter 11 and the interruption detector 13. A line 15 is arranged for transmission of the output signal from the interruption detector 13 to the control unit 8.

Figure 2:
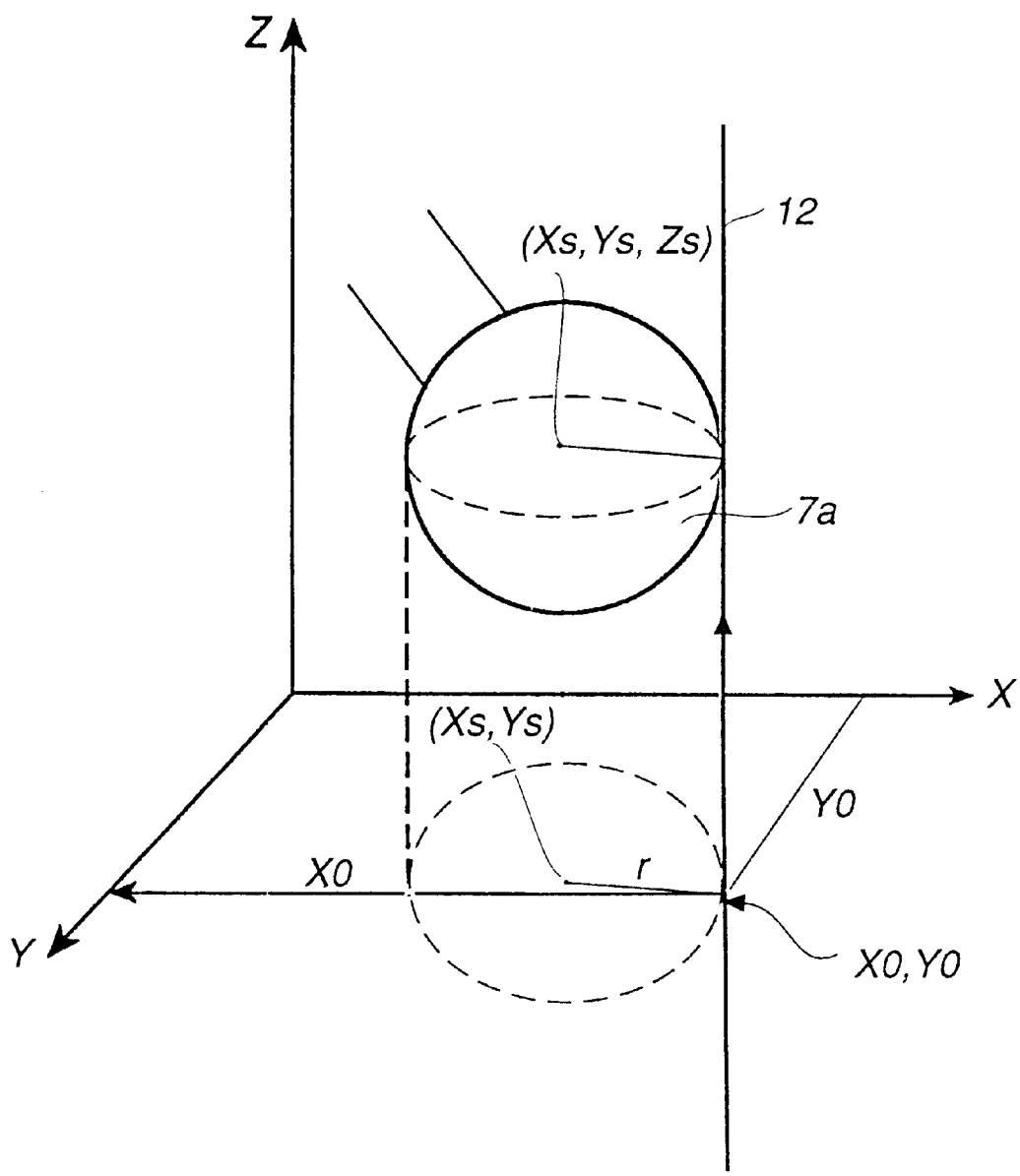
FIG. 2 shows a vertical calibration beam in the base coordinate system of the robot.

FIG. 2 shows the base coordinate system (x,y,z) of the robot, which system is an orthogonal coordinate system with the z-axis coinciding with the axis of rotation A1 and with the x-axis and the y-axis in predetermined directions relative to the robot foot 2. The center of the spherical body 7a has the coordinates $(x_s, y_s, z_s)$. The calibration beam is parallel to the z-axis. The coordinates $x_0$ and $y_0$ are the intersection of the calibration beam with the xy plane. These two coordinates constitute two unknown parameters and must be added to the number of calibration parameters which are to be calibrated.

In the calibration method according to the invention, a plurality of measurements are carried out. The number of measurements should be at least as large as the number of unknown parameters, that is, the number of calibration parameters to be calibrated plus two. The number of measurements may, however, advantageously be larger, preferably considerably larger, whereby increased accuracy of the calibration may be obtained. The calibration method according to the invention also tends to give increased accuracy the greater the difference between the robot configurations used.

During the calibration, the calibration tool is run towards the beam until the interruption detector detects an interruption of the beam. Then the difference between the center of the spherical body 7a and the beam 12 is equal to the radius r of the sphere. The equation of the sphere gives the following relationship:

$$(x_s-x_0)^2+(y_s-y_0)^2=r^2 \qquad (1)$$

During each measurement, the robot is first run, manually or automatically, to a configuration where the calibration tool 7 is at a point at some distance away from the calibration beam. The robot is then run so that the calibration tool moves in a direction towards the calibration beam until the interruption detector 13 detects that the beam has been interrupted. The movement is interrupted when an interruption has been detected. When an interruption has been obtained, the output signals from the position transducers of the robot are read and stored.

Figure 3A:
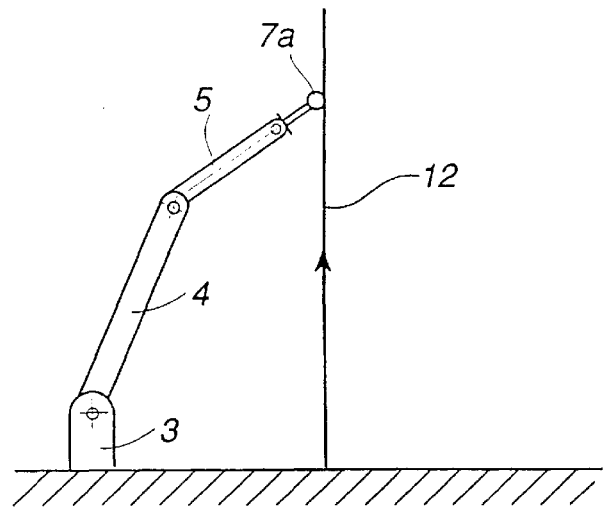
FIGS. 3a–3c show examples of various configurations which may be assumed by the robot when carrying out the calibration method.
Figure 3B:
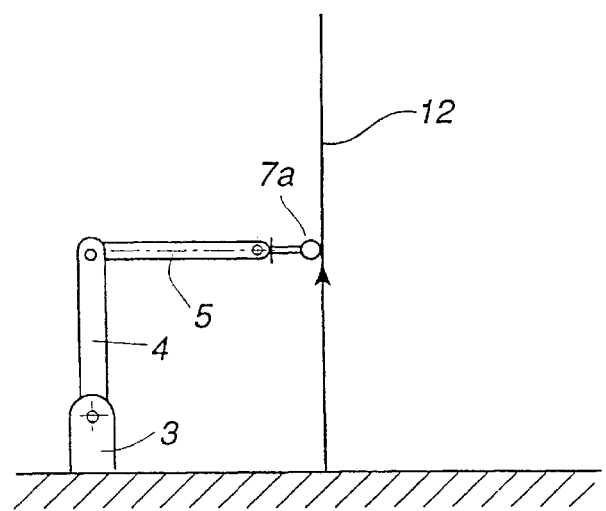
Figure 3C:
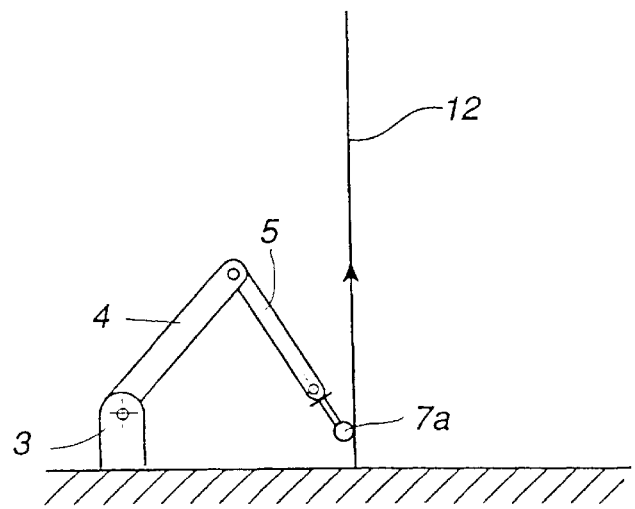

Measurements are carried out at a plurality of different points on the calibration beam with different configurations of the robot. The configuration of the robot is defined by its axial angles, and one configuration differs from another if at least some of the axial angles has been changed. FIGS. 3a–3c show examples of three different robot configurations during measurement of three different points on the calibration beam 12.

The accuracy of the calibration may be increased by calculating the calibration parameters several times with the calibration beam in varying positions in the working range of the robot. The calibration parameters may, for example, be calculated as a mean value of the calibration parameters calculated for the different positions.

As position transducers in industrial robots, resolvers are usually used, and the calibration method according to the invention will be described in the following as applied to an industrial robot with this type of position transducer. However, the invention may be applied to robots with other types of position transducers. The calibration parameters which need to be identified are for each degree of freedom of the robot:

The offset coordinate for arm link (OX, OY, OZ)

The obliquity of the axis of rotation (Y, P) of the arm link

The angular offset value of the position transducer (K2) of the axis of rotation The coordinates for the intersection of the calibration beam with the xy plane $(x_0, y_0)$ For a 6-axis robot, this gives in total 38 parameters which are to be identified. Altogether, thus, 38 positionings in relation to the calibration beam are required. Upon each positioning the position transducer of the robot is read.

The kinematic model of the robot, that is, the relationship between the coordinates for the position of the calibration tool, in this example the center coordinates $(x_s,y_s,z_s)$ of the sphere, and the arm angles of the robot may be expressed by:

$$f_x(\theta)=x_s$$
$$f_y(\theta)=y_s$$
$$f_z(\theta)=z_s \qquad (2)$$

The arm angle (θ) can be expressed in the deflection Φ of the position transducers by $$\theta=K1\ \Phi+K2 \qquad (3)$$

where

K1 is the transmission gear ratio between the arm angle and the position transducer. (K1 is known)

K2 is an unknown angular offset value.

Equations 1 and 2 give:

$$(f_x(\theta)-x_0)^2+(f_y(\theta)-y_0)^2=r^2 \qquad (4)$$

After inserting the expression for arm angle θ and the read values of the position transducers Φ for the positioning in question, the equation can be expressed as follows:

$g(K21, K22, K23, K24, K25, K26,$ $OX1, OX2, OX3, OX4, OX5, OX6,$ $OY1, OY2, OY3, OY4, OY5, OY6,$ $OZ1, OZ2, OZ3, OZ4, OZ5, OZ6,$ $Y1, Y2, Y3, Y4, Y5, Y6,$ $P1, P2, P3, P4, P5, P6, X0, Y0) = r^2$

Or written in a more compact way:

$g(K2, OX, OY, OZ, Y, P, QO) = r^2$

In this way, at least 38 equations are generated.

The calculation of the unknown calibration parameters from the non-linear equation system may be made according to the following:

First, preliminary values of the calibration parameters are set. The initial angular offset values K2 may be obtained by bringing the robot to an approximate initial position (arm angles~0), whereupon the resolver angles on each axis are read. Also $x_0$, $y_0$ are estimated. The other calibration parameters are set to zero (nominal robot). For each measurement j, the distance between the center of the calibration tool and the center of the sphere is calculated, starting from the read resolver values and from the kinematic model of the robot. The difference $\epsilon_j$ between the value thus calculated and the known distance r is formed. When these differences are formed for all positionings, a quantity $\epsilon = \sqrt{\epsilon_1^2 + \epsilon_2^2 + \ldots + \epsilon_{38}^2}$ is determined.

The quantity $\epsilon$ is then compared with a predetermined tolerance value. If $\epsilon$ is greater than this value, the set values are adjusted according to the Newton-Gauss algorithm for solution of overdetermined non-linear equation systems, and the above-mentioned method is repeated until $\epsilon$ falls below the tolerance value. Finally, the calibration parameters thus determined are stored to be used for correcting the position of the robot during operation.

To make it possible to determine the unknown parameters, the number of measurements must be at least as large as the number of parameters to be calibrated. In the case described above, it has been assumed that all the six axes of the robot are to be calibrated, and the smallest number of measurements, namely, 2+6·6=38, has been assumed. However, it may be suitable to carry out a considerably larger number of measurements with different configurations, which has contributed to improved accuracy during the calibration.

Figure 4:
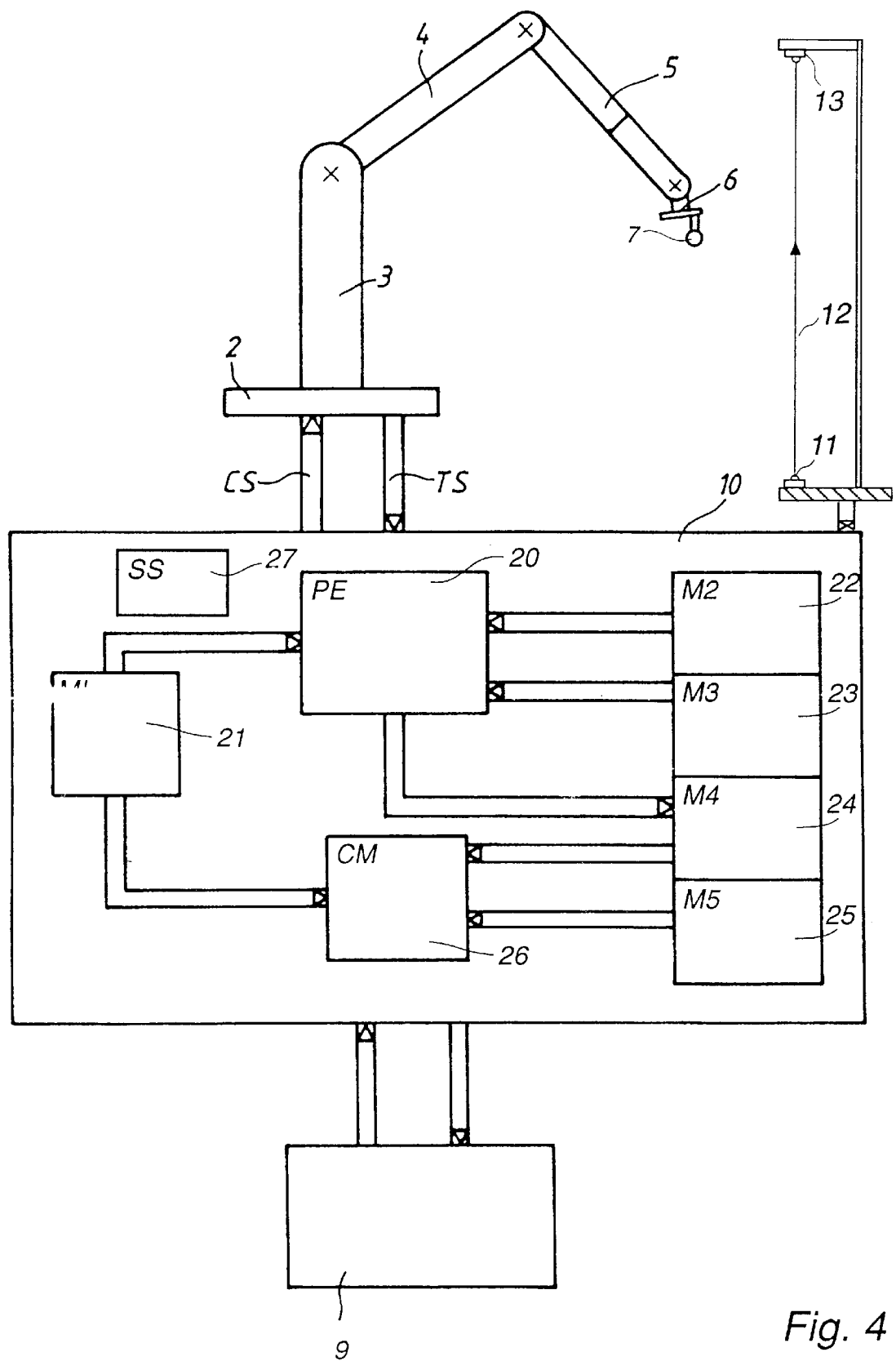
FIG. 4 shows the composition of an industrial robot system with means for carrying out the calibration method.

FIG. 4 shows, in principle, the composition of an industrial robot system with control means for automatically carrying out the calibration method described above. The robot 2–6 is provided in the manner described above with a calibration tool 7. Of the control unit, FIG. 4 shows a program executor 20, which in a known way causes the robot to carry out a stored program. In a first memory 21, the kinematic model of the robot is stored. In a second memory 22, the movement program for the calibration process is stored. In a third memory 23, values of the preliminary calibration parameters are stored prior to the automatic calibration process. A fourth memory 24 is intended for storage of the resolver values read for each measurement during the calibration process. In a fifth memory 25, there are stored, prior to the automatic calibration process, the necessary basic data such as the length $l_1$ and the offset $l_2$ and the radius r of the calibration tool.

The control equipment further comprises calculating means 26 which, when all the measurements have been executed, on the basis of the read resolver values, the kinematic model and basic data from the fifth memory 25, calculate the calibration parameters in the manner described above. The control equipment delivers the necessary control signals CS to the robot and receives from the robot the resolver values TS. Further, the control unit of the robot comprises a member 27 which generates a stop signal to the robot when the output signal from the interruption detector 13 indicates that the calibration beam 12 is interrupted.

Figure 5:
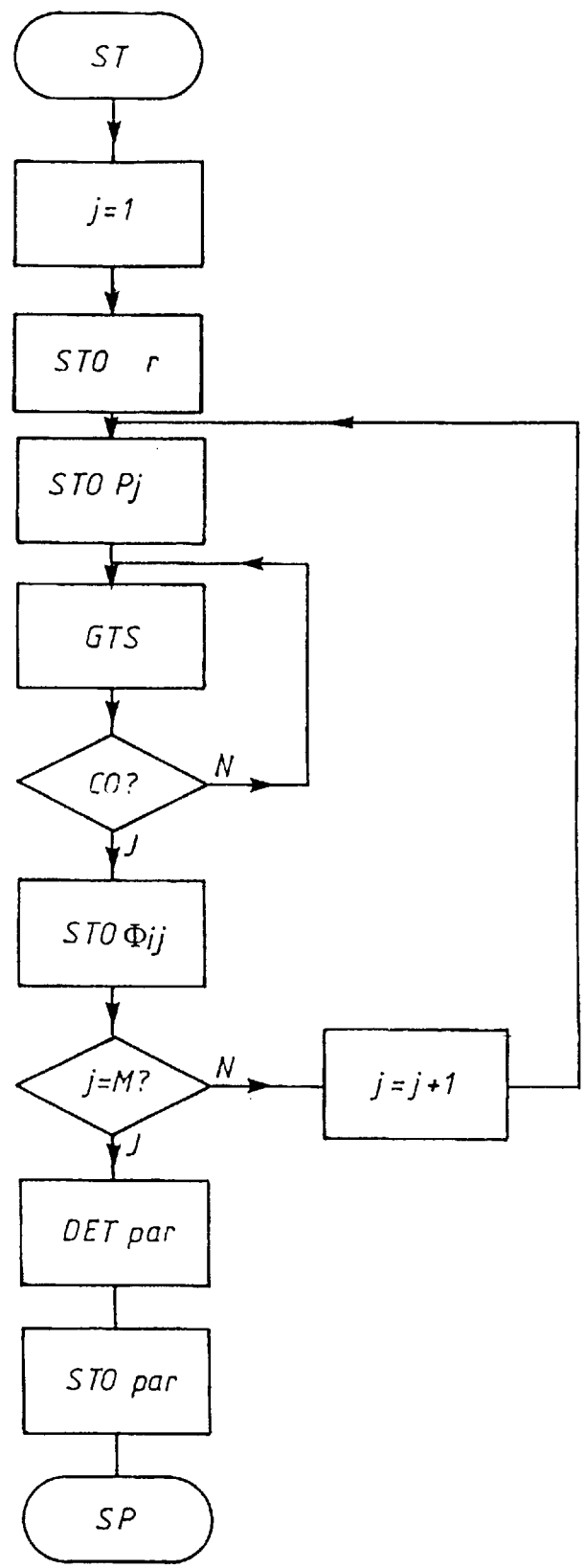
FIG. 5 shows in the form of a flow diagram an example of a program for automatically carrying out the calibration method.

Prior to the calibration, a calibration program is stored in the memory area 22, for example once for all. The program is adapted to control the movements of the robot and the other functions during the calibration process. Further, there are stored in the memory area 23 preliminary values for the calibration parameters, and in the memory area 25 the radius r of the calibration tool. The structure of the calibration program is shown in FIG. 5. The quantity j denotes the current measurement and it is assumed that M measurements are to be performed. After start of the program, ST, j=1 is set. Thereafter, the radius r (STO r) of the calibration tool and coordinates for a starting-point (block STO $P_j$) are stored in the working storage of the equipment. This information indicates in which direction the calibration tool is to be moved from the starting-point to reach the calibration beam. Then, the robot is moved, block GTS, in a direction towards the calibration beam. In block CO? it is sensed whether the beam has been interrupted. If the answer is no, the movement is continued, and if the answer is yes, the resolver values $\Phi_{ij}$ are stored in the memory area 24, block STO $\Phi_{ij}$ (i=axis number). After this, it is investigated in block j=M? whether all the desired measurements have been carried out. If this is not the case, j=j+1 is set and the next measurement is carried out. When all the measurements have been carried out, that is, when j=M, the program proceeds to a calculation process, DET par, where the calibration parameters are determined. The parameters thus determined are then stored—STO par—to be subsequently used during operation of the robot. Thereafter, the program is ended, block SP.

Figure 6:
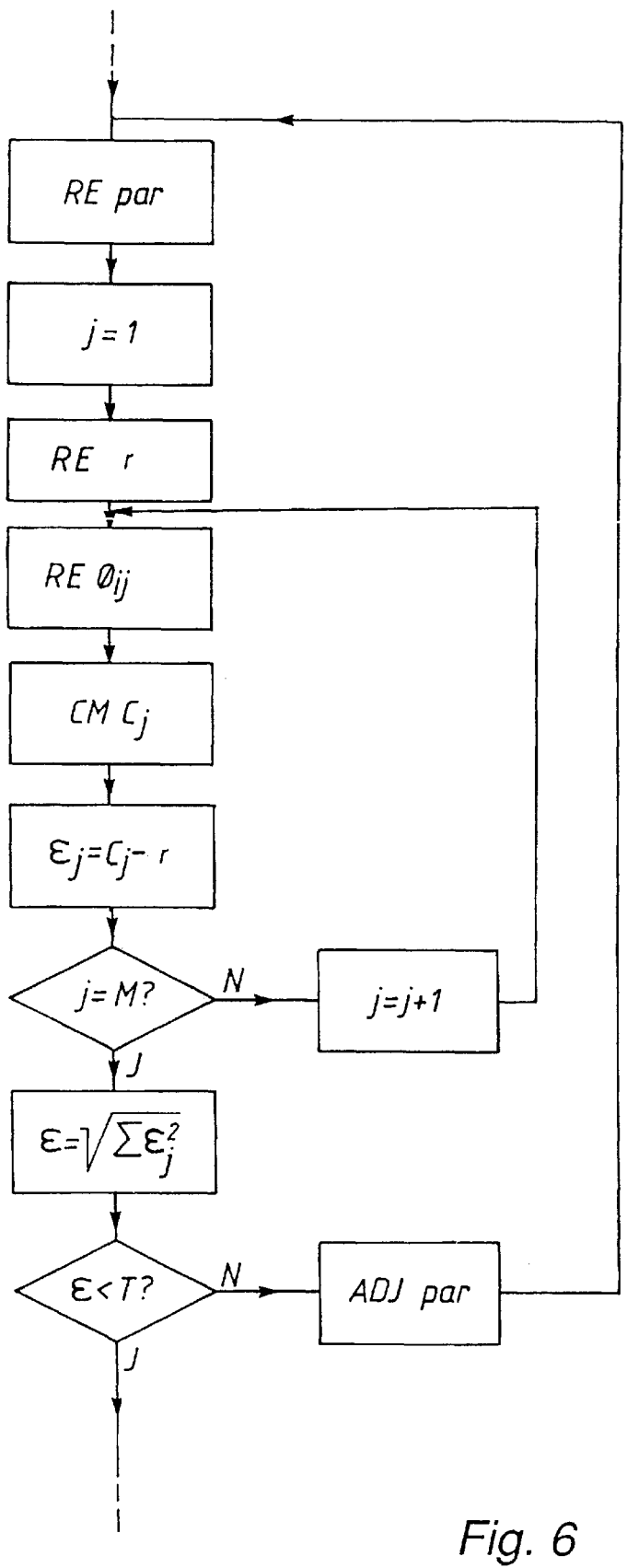
FIG. 6 shows in the form of a flow diagram the principle of carrying out the calculations, by means of which the calibration parameters are obtained as a result of the calibration method.

FIG. 6 shows in more detail the structure of the functional block DET par. The calculation starts with a reading of current values of the calibration parameters, block RE par. The first time, these values are fetched from the memory area 23, where the preliminary calibration parameters are stored. Thereafter, j=1 is set, that is, the first measurement is chosen. The radius r of the calibration tool is stored in the working storage. The resolver values $\Phi_{ij}$ read and stored for this measurement are read. This is carried out in blocks RE r and RE $\Phi_{ij}$. Then the distance $C_j$ between the center of the calibration tool and the calibration beam for the current measurement is measured, based on the kinematic model of the robot. Thereafter, the difference $\epsilon j = C_j - r$ is formed. Thereafter, j=M?, it is sensed whether all the measurements have been completed. If this is not the case, j=j+1 is set and the corresponding calculation is carried out for the next measurement. When all the measurements have been completed, j=M and a quantity $\epsilon = \sqrt{\epsilon_1^2 + \epsilon_2^2 + \ldots + \epsilon_{38}^2}$ is formed. If this quantity amounts to or exceeds a predetermined tolerance value T, this is an indication that the values used for the calibration parameters are incorrect. In such case, these values are adjusted, for example according to the above-mentioned Newton-Gauss algorithm, in block ADJ par, whereupon the calculation is repeated. This process is repeated with successive adjustments of the calibration parameters and subsequent determinations of the error $\epsilon$ until the last-mentioned quantity falls below the predetermined tolerance level. When this is the case, the program proceeds to the next block in FIG. 6, where the last values used for the calibration parameters are stored.

Figure 7A:
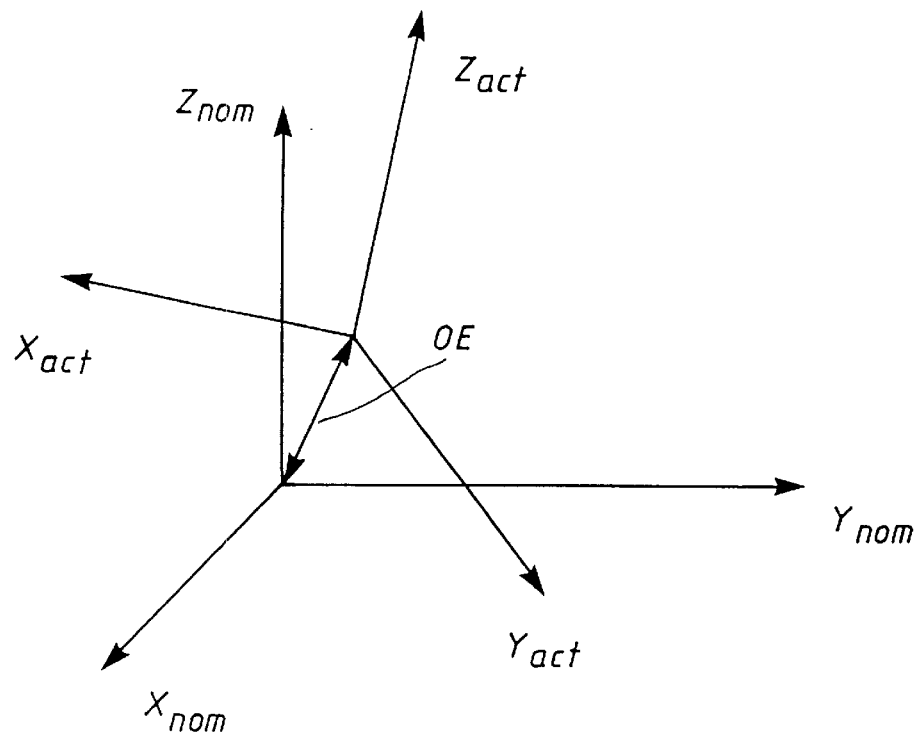
FIG. 7 illustrates the calibration parameters for a robot axis.
Figure 7B:
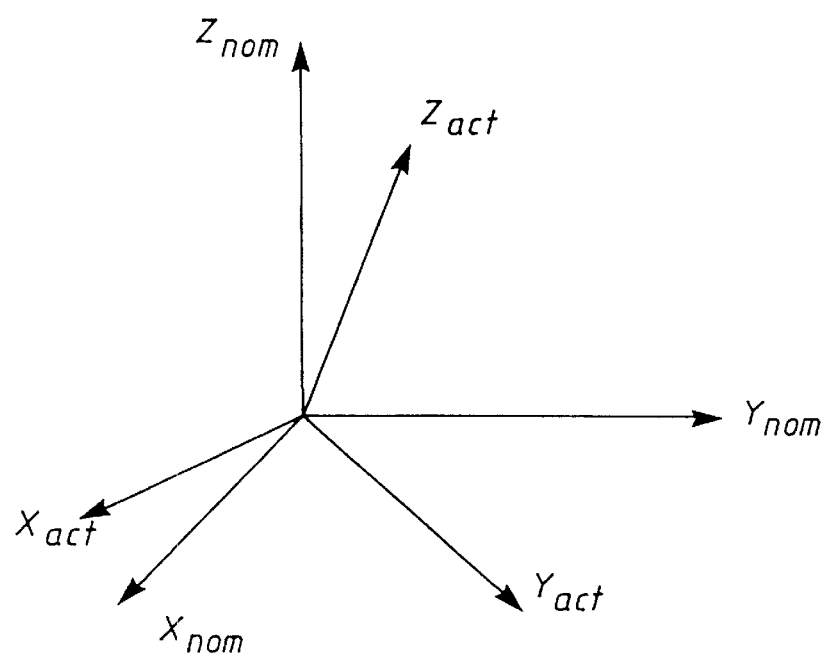

FIGS. 7a, 7b show calibration parameters for a robot axis. The figures shows the nominal coordinate system $X_{nom}$, $Y_{nom}$, $Z_{nom}$ of an axis as well as its actual coordinate system $X_{act}$, $Y_{act}$, $Z_{act}$. The latter deviates from the former by an offset error and an attitude error.

As shown in FIG. 7a, the position of the origin of coordinates in the actual coordinate system in relation to the origin of coordinates in the nominal coordinate system is described by a vector OE. This vector has three components and is expressed in the nominal coordinate system.

As shown in FIG. 7b, the actual coordinate system has an attitude error in relation to the nominal system. Three angles are required to rotate the actual system into correspondence with the nominal one, and these three angles denote the attitude error.

The three components of the offset vector OE and the three angles of the attitude error constitute the six calibration parameters of the current robot axis.

In a preferred embodiments, the calibration beam is placed parallel to any of the xy, yz or xz plane in the base coordinate system of the robot. The calibration beam may also be placed completely arbitrarily within the working range of the robot, but then two more parameters are added which need to be identified, namely $k_x$ and $k_y$, which define the direction of the beam.

In the above embodiment, a laser beam has been used as calibration beam, but other types of beams may be used, such as an IR beam.

In the above embodiment, calculating means associated with the control system of the robot have been used for calculating the calibration parameters. It is, of course, also possible to use other calculating means outside the robot.

In the foregoing, the invention has been described with reference to an industrial robot with rotating axes only, but the invention may be applied with the same advantage to robots with linear axes only, or with a combination of linear and rotating axes. Likewise, the method according to the invention is applicable to robots with a number of axes different from that described above. Further, it has been described above how the method is used for calibration of all of the axes of the robot. It may sometimes be suitable to refrain from calibrating one or more of the robot axes. To achieve the greatest possible variation between the robot configurations used, the robot may be provided with several calibration beams arranged at different locations within the working range of the robot, which locations are chosen such that the greatest possible differences are obtained between the robot configurations during the different measurements.

It has been described above how six calibration parameters are determined for each robot axis. The number may be greater, for example if it is desired to take into account also nonlinearities of the position transducers of the axis during the calibration. The number may also be smaller, for example if it is known from experience that one or a few calibration parameters are known or of a negligible magnitude.

I claim:

1. A method for calibration of an industrial robot which has a plurality of movement axes (A1–A6) with a position transducer for each of said axes adapted to supply an output signal which defines the current position of the axis, a robot hand for supporting a tool, and a control system for controlling the position and orientation of the robot hand in accordance with a program, wherein a number of calibration parameters for the robot are determined by the following steps:
   a) providing the robot with a calibration tool, supported by the robot hand, comprising a sphere with a known radius (r),
   b) providing a member adapted to transmit a calibration beam within the working range of the robot, and a member connected to the control system which detects an interruption in the calibration beam,
   c) running the calibration tool towards the calibration beam,
   d) reading and storing the output signals from the position transducers of the robot when an interruption in the calibration beam is detected,
   e) repeating steps c) and d) a number of times at least equal to the number of calibration parameters plus two and with different configurations of the robot,
   f) calculating the calibration parameters based on:
      1) the kinematic equations of the robot,
      2) a model of the relationship between axial position and position transducer signal,
      3) the read and stored position transducer signals, and
      4) the known radius.

2. A method according to claim 1, wherein the calibration beam is arranged parallel to a plane (xY' xz, YZ) in the robot base coordinate system.

3. A calibration device for determining calibration parameters for an industrial robot which includes
   a plurality of movement axes (A1–A6) with a position transducer for each of said axes adapted to supply an output signal which defines the current position of the axis,
   a robot hand for supporting a tool, and
   a control system for controlling the position and orientation of the robot hand in accordance with a program and adapted to receive the output signals of the position transducers the calibration device comprising:
   a calibration tool provided with a sphere having a known radius (r) and adapted to be supported by the robot hand,
   a member for transmitting a calibration beam within the working range of the robot,
   a member for detecting an interruption in the calibration beam for connection to the control system and for initiation of reading and storage of the output signals from the position transducers of the robot, and
   calculating means adapted to calculate a number of calibration parameters based on:
      1) the kinematic equations of the robot,
      2) a model of the relationship between axial position and position transducer signal,
      3) the read and stored position transducer signals, and
      4) the known radius.

4. A calibration device according to claim 3, wherein the calibration beam consists of a light beam.

* * * * *